United States Patent [19]

Monticelli et al.

[11] 4,346,380
[45] Aug. 24, 1982

[54] SIMULTANEOUS COMMUNICATION OF ANALOG AND BINARY INFORMATION IN A SINGLE FRAME OF A PULSE COUNT MODULATED DIGITAL SIGNAL

[75] Inventors: Dennis M. Monticelli, Fremont; William M. Howard, Campbell; Robert S. Sleeth, San Jose, all of Calif.

[73] Assignee: National Semiconductor Corporation, Santa Clara, Calif.

[21] Appl. No.: 140,589

[22] Filed: Apr. 15, 1980

Related U.S. Application Data

[63] Continuation of Ser. No. 968,174, Dec. 11, 1978, abandoned.

[51] Int. Cl.$^3$ .............................................. H04J 3/00
[52] U.S. Cl. ........................... 340/825.63; 340/870.13; 340/870.24
[58] Field of Search ... 340/347 M, 347 AD, 347 DA, 340/347 DD, 147 PC, 349, 825.63, 870.13, 870.19–870.24; 244/189, 190; 46/253–257, 210

[56] References Cited

U.S. PATENT DOCUMENTS

| | | | |
|---|---|---|---|
| 3,377,585 | 4/1968 | Magnin | 340/168 R X |
| 3,430,255 | 2/1969 | Avignon | 340/347 AD |
| 3,898,647 | 8/1975 | Morra et al. | 340/347 DD |

OTHER PUBLICATIONS

Saxton et al., Optimal Frame Synchronization, IEEE Transactions on Computers, 2/1977, vol. C-26, No. 2, pp. 170-174.

*Primary Examiner*—Thomas J. Sloyan
*Attorney, Agent, or Firm*—Brown & Martin

[57] ABSTRACT

A communication system for providing both analog information pulses and digital information pulses in a single frame of a pulse train, including circuitry for sequentially multiplexing and modulating a first given number "m" of analog information input channels to provide "m" analog information pulses in each frame of the pulse train to convey information respectively representative of the analog information in the analog information input channels; and circuitry for modulating a second given number "n" of binary information input channels to provide a variable number of digital information pulses and for multiplexing the variable number of digital information pulses in each frame of the pulse train sequentially to the analog information pulses, wherein the variable number of digital information pulses is within a range of $2^n$ pulses to convey information respectively representative of the binary information in the "n" binary information input channels. A system for producing analog information signals and binary information signals from such a pulse train includes a binary counter for counting the number of information pulses in each frame of the pulse train; "m" gates coupled to given stages of the counter for producing "m" analog information signals respectively conveying the analog information conveyed by the "m" analog information pulses in each frame; and "n" gates coupled to given stages of the counter for producing "n" binary information signals containing binary information that is representative of the number of digital information pulses included in the count for each frame. The counter is reset by a sync pulse included in each frame of the pulse train the binary information is read from the counter in response to the sync pulse to produce the binary information signals.

3 Claims, 6 Drawing Figures

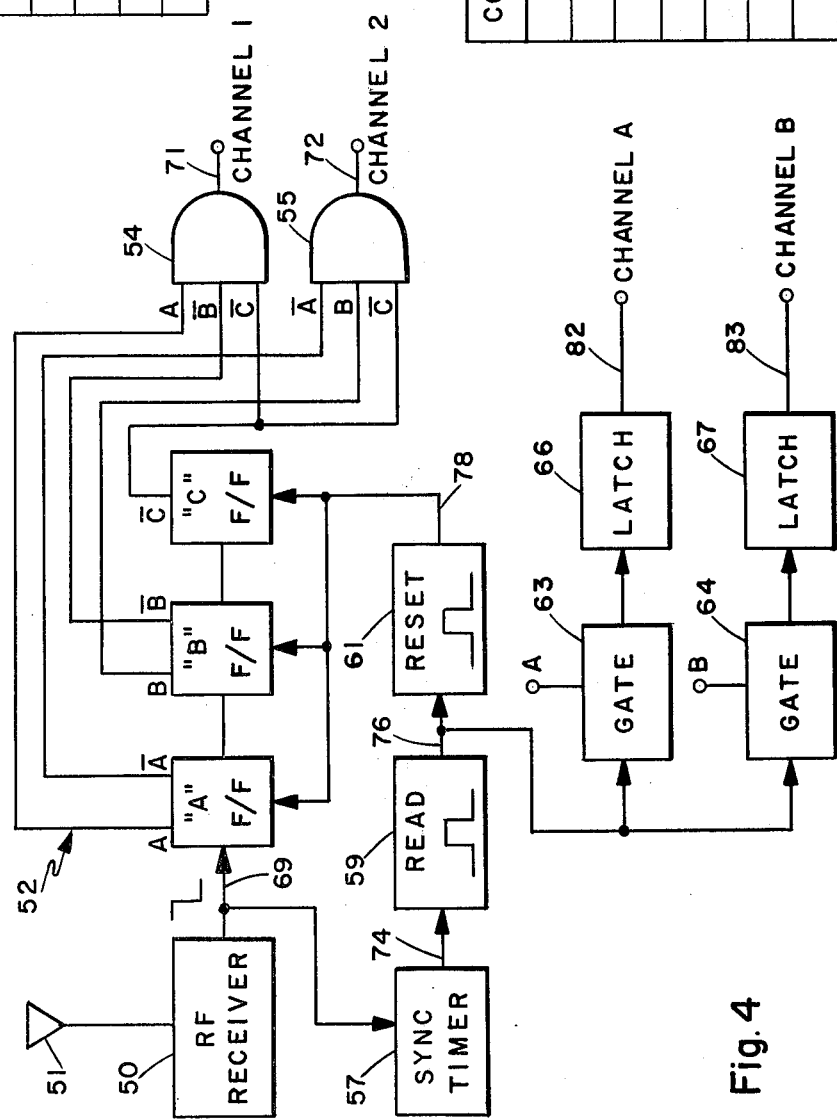

SIMULTANEOUS COMMUNICATION OF ANALOG AND BINARY INFORMATION IN A SINGLE FRAME OF A PULSE COUNT MODULATED DIGITAL SIGNAL

This is a continuation of application Ser. No. 968,174 filed in Dec. 11, 1978 now abandoned.

BACKGROUND OF THE INVENTION

The present invention generally pertains to data processing and is particularly directed to a scheme for simultaneously conveying both analog and digital information in a common digital signal.

It is desired to provide a simple, inexpensive scheme for communicating information from a given number of analog information input channels simultaneously with information from a given number of digital information input channels. Pulse width modulation (PWM) systems may be used for communicating both digital and analog information in a common digital signal. However, with a prior art PWM system, upon demodulation it is necessary to compare the duration of the receiver pulses with a reference pulse of a predetermined width. The implementation of this comparison of duration involves a significant amount of circuitry. In addition, this system requires calibration of the reference pulse in the demodulation section of the receiver in relation to the respective range of pulse widths provided by the modulation section of the transmitter. These drawbacks are significant in cost-sensitive applications.

One such application where expense is an important consideration is in the toy industry. And, a principal intended use of the present invention is for remotely controlling toys such as cars, robots, trains and model airplanes, wherein the analog information is communicated for providing proportional control and the digital information is communicated for providing on/off control.

Multiplexing schemes can also be used for simultaneously communicating both digital and analog information in a common digital signal. However, communications systems incorporating multiplexing also are too complicated and expensive for low-cost toy applications.

When a digital signal containing only digital information is to be decoded, typically tone decoders for detecting different audio frequency tones are used. However, these decoders also require calibration, and either include bulky capacitors and inductors, operational amplifiers, or phase-locked loops, which dissuade their use in low-cost toy application, where size and cost are principal considerations.

SUMMARY OF THE INVENTION

In accordance with the present invention, there is provided a simple, inexpensive communications system wherein pulse count modulation is combined with a modulation scheme for modulating analog information to be conveyed in digital signals, such as PWM or pulse position modulation (PPM) for communicating both analog information pulses and digital information pulses in a single frame of a pulse train. The modulator portion of the communications system includes circuitry for providing a sync pulse for each frame of a pulse train; circuitry for sequentially multiplexing and modulating a first given number "m" of analog information input channels to provide "m" analog information pulses in each frame of the pulse train to convey information respectively representative of the analog information in the analog information input channels; and circuitry for modulating a second given number "n" of binary information input channels to provide a variable number of digital information pulses and for multiplexing the variable number of digital information pulses in each frame of the pulse train sequentially to the analog information pulses, wherein the variable number of digital information pulses is within a range of $2^n$ pulses to convey information respectively representative of the binary information in the "n" binary information input channels.

The demodulation portion of the communications system is designed for producing analog information signals and binary information signals from a pulse train wherein each frame of the pulse train contains a sync pulse, a sequence of a first given number "m" of analog information pulses each conveying information respectively representative of analog information for "m" analog information signals and a sequence of a first given number "m" of analog information pulses each conveying information respectively representative of analog information for "m" analog information signals and a sequence of a variable number of digital information pulses wherein the variable number of digital information pulses is within a range of $2^n$ pulses to convey information respectively representative of binary information for a second given number "n" of binary information signals. The demodulator portion of the system includes a counter for counting the number of information pulses in each frame of the pulse train; "m" gates coupled to the counter for producing "m" analog information pulses in each frame; "n" gates coupled to the counter for producing "n" binary information signals containing binary information that is representative of the number of digital information pulses included in the count for each frame; and circuitry for resetting the counter in response to the sync pulse. The binary information is read from the counter in response to the sync pulse to produce the binary information signals.

In the preferred embodiment of the system, wherein the sequentially first "m" information pulses of the pulse train are modulated to convey analog information, the counter in the demodulator portion of the system is a binary counter having a plurality of stages for registering a binary count of the number of pulses in each frame of the pulse train; "m" gates are coupled to the stages of the binary counter for producing the "m" analog information signals respectively conveying the analog information conveyed by the first "m" information pulses in each frame. The demodulator portion of the system further includes an additional "n" gates coupled to given stages of the binary counter for producing "n" binary information signals containing binary information that is representative of the content of the given stages of the counter. The binary information is read in response to the sync pulse.

BRIEF DESCRIPTION OF THE DRAWING

FIG. 3 is a table relating the condition of signals on channels A and B in FIG. 1 to the condition of the signals in channels 3, 4, 5 and 6 in said FIG. 1.

FIG. 4 is a combination block and schematic circuit diagram of a receiver for practising the communications scheme of the present invention compatibly with the transmitter circuit shown in FIG. 1.

FIG. 6 is a table relating the condition of the signals on channels A and B in FIG. 4 to the contents of the three-stage binary counter shown therein.

DESCRIPTION OF THE PREFERRED EMBODIMENT

Figure 1:
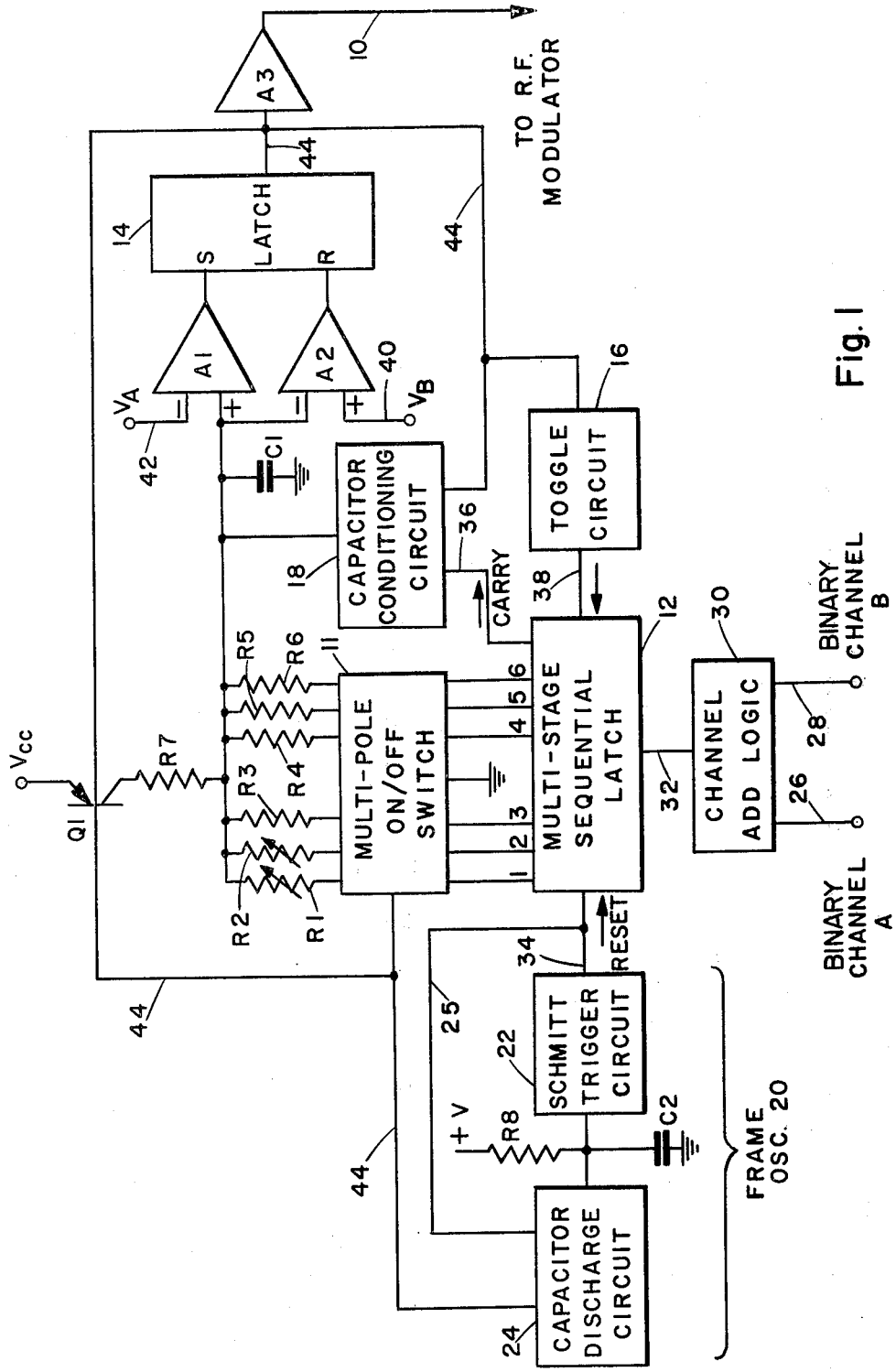
FIG. 1 is a combination block and circuit diagram of a transmitter for practising the communications scheme of the present invention.

The essential elements of a preferred embodiment of a transmitter for providing both analog information and digital information in a single frame of a pulse train are shown in FIG. 1. Basic to the transmitter is a PWM circuit for producing a pulse train on line 10 to an RF modulator (not shown). The PWM circuit includes six channel resistors R1, R2, R3, R4, R5 and R6, a modulating resistor R7, a multi-pole on/off switch 11, a multi-stage sequential latch circuit 12, a transistor Q1, a first capacitance C1, a pair of first and second differential amplifiers A1 and A2, a latch circuit 14, a third amplifier A3, a toggle circuit 16, a capacitor conditioning circuit 18, and a frame oscillator 20, which includes a second capacitance C2, a Schmitt trigger circuit 22, a resistance R8, a capacitor discharge circuit 24 and line 25 for completing a relaxation oscillator loop.

The analog information channels are defined by the settings of the variable resistances R1 and R2. Actually there is no limit to the number of analog information channels that may be provided in a system according to the present invention. If more analog information channels are desired, additional variable resistances, such as R1 and R2 can be provided.

Binary information from a pair of binary information input binary channels, "channel A" and "binary channel B" is provided on lines 26 and 28 to a channel add logic circuit 30. The channel add logic circuit 30 translates the state of the two binary signals received on lines 26 and 28 to a binary number and provides a signal on line 32 to the multi-stage sequential latch circuit 12 that is indicative of this binary number. The multi-stage sequential latch circuit 12 in turn provides signals on available channels 3, 4, 5 and 6 to the multipole on/off switch 11 to sequentially cause a number of digital information pulses to be provided in the pulse train on line 10 by the resistances R3, R4, R5 and R6 related to the binary number translated by the channel and logic circuit 30.

If more binary information channels are desired, additional fixed resistances, such as R3, R4, R5 and R6 are required. When there are three binary information channels, eight fixed resistances are required. In general, $2^n$ fixed resistors are required, where n equals the number of binary information input channels. The number of stages in the multi-stage sequential latch 12 and the number of poles in the multi-pole on/off switch 11 equals the total number of variable resistances and fixed resistances.

The overall operation of the transmitter circuit of FIG. 1 is explained with reference to the signal waveforms illustrated in FIGS. 2A through 2E.

Figure 2:
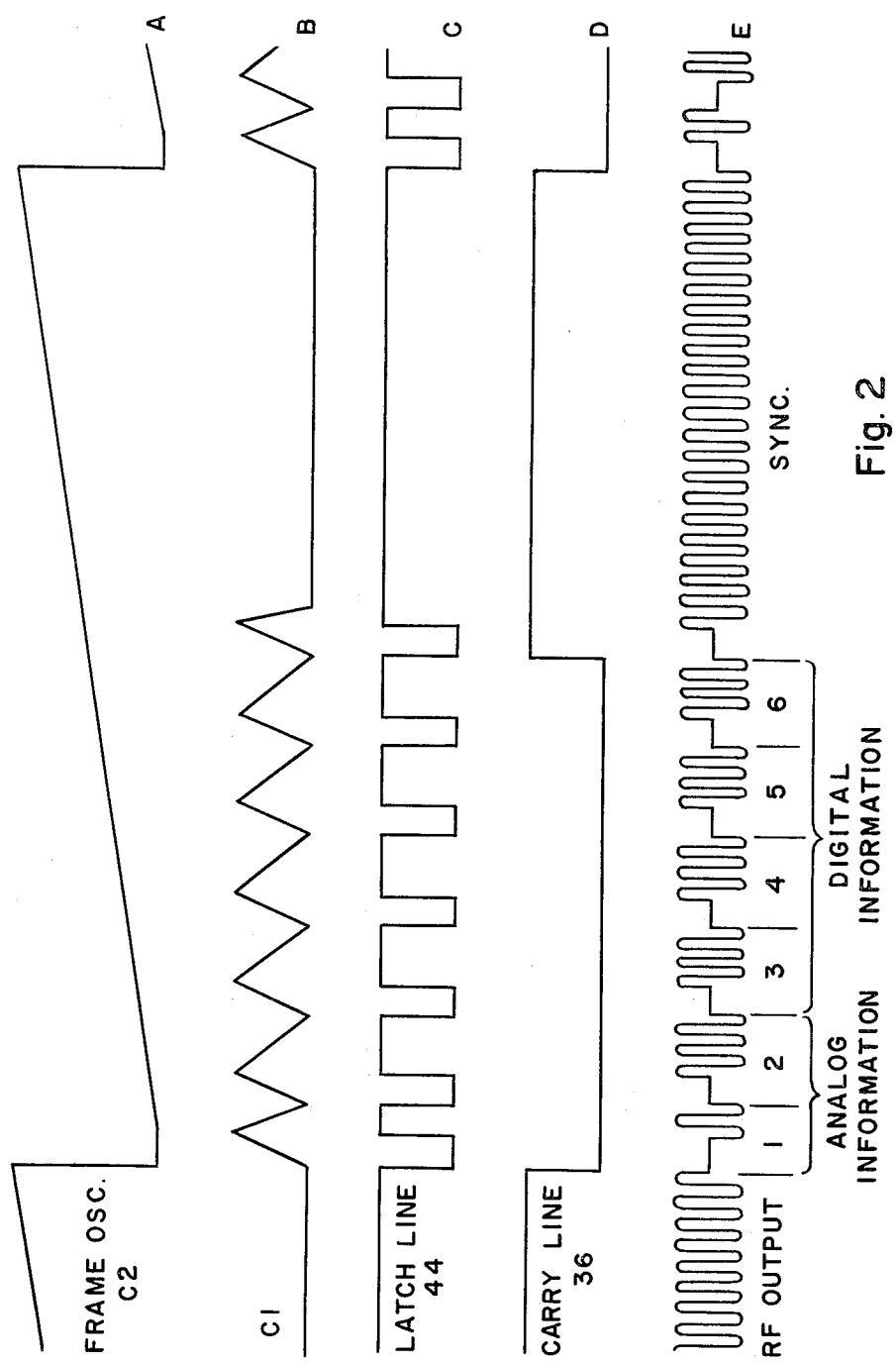
FIGS. 2A through 2E inclusive illustrate waveforms of signals that are generated at different portions of the transmitter circuit shown in FIG. 1.

The waveform of the frame oscillator circuit provided on capacitance C2 is illustrated in FIG. 2A. The duration of each pulse of the frame oscillator signal is determined by the value of the capacitance C2.

When the frame oscillator signal on capacitance C2 goes low a reset signal is provided on line 34 to the multi-stage sequential latch 12, which in turn causes the latch 12 to change the state of a "carry" signal provided on line 36 to the capacitor conditioning circuit from "high" to "low". See FIG. 2D for the "carry" signal waveform. When the carry signal goes low the capacitor conditioning circuit 18 causes the voltage on the capacitor C1, which had been maintained at $V_B$ to go below $V_B$ so as to cause the output signal on line 44 from the latch 14 to go from high to low. See FIGS. 2B and 2C for the respective waveforms of the voltage on the capacitance C1 and the latch output signal on line 44. The voltage $V_B$ is provided on input line 40 to the amplifier A2.

When the multi-stage sequential latch 12 is reset a signal is provided on channel 1 to the multi-pole on/off switch 11 for enabling the resistance R1 to be connected to circuit ground when the switch 11 is further enabled by a high-level output signal on line 44 from the latch 14.

When the latch 14 output signal on line 44 goes low, the transistors Q1 is turned on to enable the capacitance C1 to be connected to supply voltage Vcc through resistance R7, which in turn increases the charge on capacitance C1.

When the voltage on capacitance C1 exceeds $V_A$ the amplifier A1 causes the latch 14 output signal on line 44 to go from "low" to "high". The voltage $V_A$ is provided on input line 42 to the differential amplifier A1. The "high" latch output signal on line 44 then turns off transistor Q1 and prevents further charging of the capacitance C1, and further causes the multi-pole on/off switch 11 to connect the resistance R1 to circuit ground to thereby enable the charge on capacitance C1 to be decreased. When the latch output signal on line 44 first goes high it causes the capacitor discharge circuit to precondition the capacitance C2 to enable the voltage on the capacitance C2 to rise as shown in the waveform of FIG. 2A.

When the voltage on capacitance C1 is decreased $V_B$, the amplifier A2 causes the latch 14 output signal on line 44 to go from high to low. The amount of time that it takes for the voltage on the capacitance C1 to decrease to below $V_B$ is dependent upon the value of the resistance R1.

When the signal on line 44 goes from high to low, the multipole on/off switch 11 is disabled, and the toggle circuit 16 causes a signal to be provided on line 38 to the multi-stage sequential latch 12, which in turn sequentially steps the latch 12 to provide an enabling signal on channel 2 to the multi-pole on/off switch 11.

In a typical PWM circuit, the foregoing steps are repeated as the multi-stage sequential latch steps through all six channels, and the durations of the six high-level portions of the output signal on line 44 from latch 14 are dependent upon the respective values of the resistances R1 through R6. Following the provision of the enabling signal on channel 6, the sequential latch 12 changes the state of the carry signal on line 36 from low to high.

However, in the system of the present invention the multistage sequential latch circuit 12 is modified to respond to the signal on line 32 from the channel add logic circuit 30 so as to provide signals on only that number of the four channels "3", "4", "5", and "6" that corresponds to the binary number indicated by the signal on line 32.

FIG. 3 is a table illustrating the correspondence between the state of the binary information signals in input channels A and B, lines 26 and 28, and the signals which are provided on channels 3, 4, 5 and 6, by the sequential latch 12. For example, when a low signal (represented by a "0" in the table of FIG. 3) is provided on each of channels A and B, a high enabling signal (represented by a "1" in the table of FIG. 3) is provided on only channel 3 from the sequential latch 12 to the multi-pole on/off switch 11. In such case the output signal on line 44 from the latch 14 would have only three high level pulses during the interval while carry signal is low during the frame.

When the high-level interval of the last pulse to be provided is completed, the sequential latch responds to the toggle signal on line 38 to change the state of the carry signal on line 36 from low to high. The capacitor conditioning circuit 18 responds by enabling the capacitance C1 to be charged to exceed $V_A$ so as to latch the output signal on line 44 high. However, the capacitor conditioning circuit then brings the voltage on capacitance C1 back down to $V_B$, as shown in FIG. 2B, but does not drive the voltage on capacitance C1 below $V_B$, and thereby maintains the latch output signal on line 44 high until the end of the frame.

The latch output signal on line 44 is conditioned by amplifier A3 and provided to an RF modulator circuit (not shown) via line 10.

The waveform of the RF output signal provided by the transmitter in response to the signal on line 10 is shown in FIG. 2E. The RF carrier is suppressed during the intervals while the latch output signal on line 44 is low. Thus the durations of the first two information pulses carried by the RF signal define analog information, whereas the number of additional information pulses carried by the RF signal define digital information. The interval between the series of information pulses defines a sync pulse. The waveform shown in FIG. 2E would be provided when high level (1) binary signals are provided on each of binary information channels A and B, as indicated by the table of FIG. 3.

FIG. 4 shows the essential elements of a preferred embodiment of a receiver for producing both analog information signals and binary information signals from a pulse train modulated by the transmitter of FIG. 1. The receiver includes an RF receiver 50 connected to an antenna 51, a three-stage binary counter 52 including flip-flops A, B and C, a pair of AND gates 54 and 55, a sync timer circuit 57, a read counter one-shot circuit 59, a reset counter one-shot circuit 61, a second pair of gates 63 and 64, and a pair of latch circuits 66 and 67. Exemplary receiver waveforms are shown in FIGS. 5A through 5J. However, these waveforms are not compatible with the waveforms of FIGS. 2A through 2E as to either the durations or the relative placement of the respective information pulses.

Figure 5:
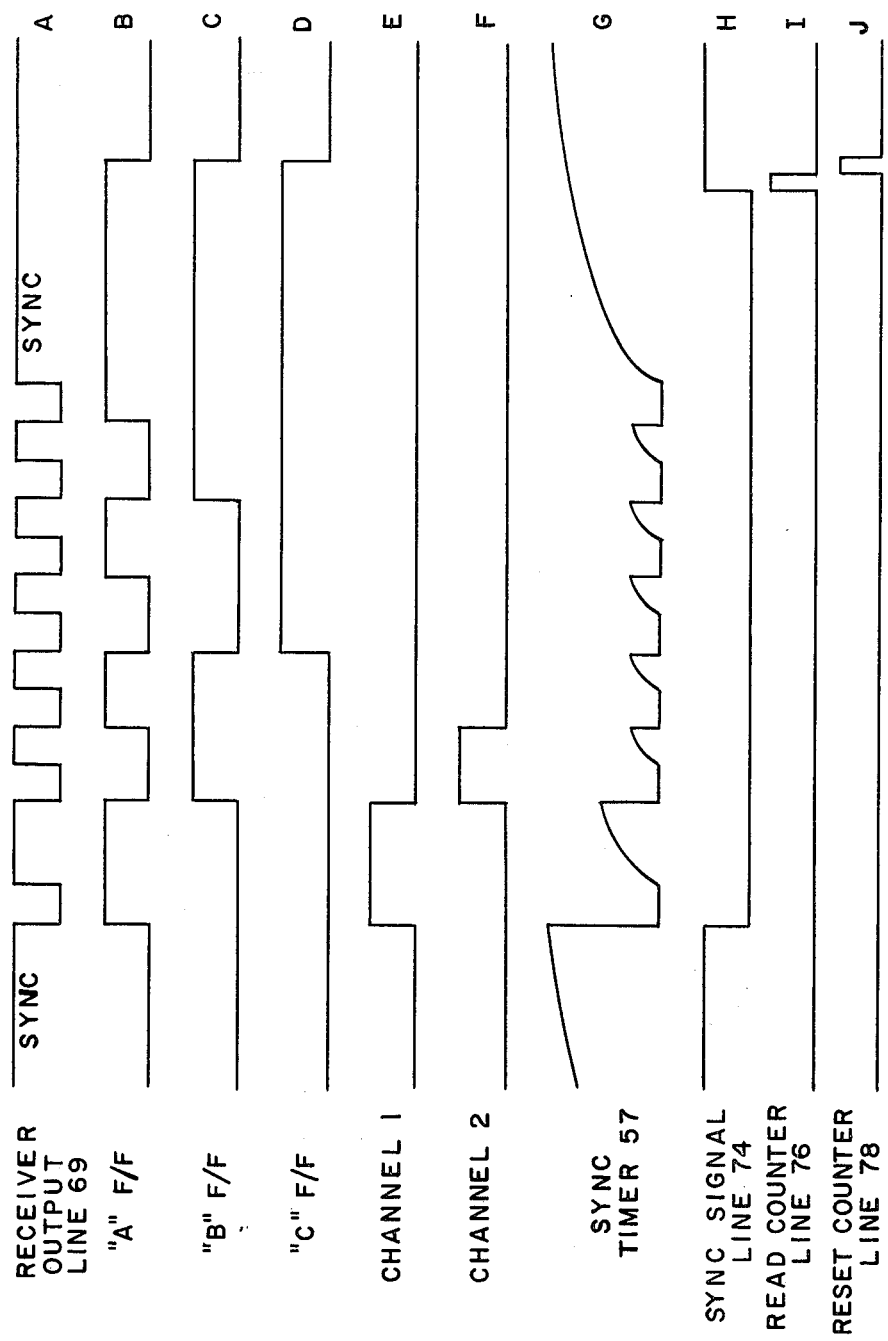
FIGS. 5A through 5J inclusive illustrate waveforms of signals that are generated at different portions of the receiver circuit shown in FIG. 4. These waveforms are not compatible with the waveforms of FIGS. 2A through 2E.

The RF receiver 50 demodulates an RF signal received by the antenna 51 from the transmitter circuit of FIG. 1, and produces a pulse train on line 69, as shown in FIG. 5A, to the binary counter 52. The counter 52 registers one count upon each negative-going transition of the pulse train signal on line 69 (FIG. 2A). Thus when a frame of the pulse train on line 69 includes two analog information signal pulses and four digital information signal pulses, as shown in FIG. 2A, a total count of seven is registered in the binary counter 52. The binary state of each of the flip-flops A, B and C at each step of accumulation of the count of the pulses in the pulse train on line 69 is shown in the table of FIG. 6. The binary counter is always reset during the sync pulse, so that the negative-going transition at the conclusion of the sync pulse always produces a count of "1" in the counter.

Each frame of the pulse train on line 69 always contains two information pulses having a width that varies in accordance with pulses width modulation so as to convey analog information; and the binary counter 52 always registers a count of "3" after the two analog information pulses have been received.

A pair of AND gates 54 and 55 are connected to the three stages A, B and C of the binary counter 52 for producing two analog information signals on lines 71 and 72 respectively. The analog information signals on lines 71 and 72, designated channel 1 and 2 respectively, convey the analog information conveyed by the first two information pulses in the pulse train on line 69. The AND gate 54 has its inputs connected to the A output of flip-flop A, the $\overline{B}$ output of flip-flop B and the $\overline{C}$ output of flip-flop C. The AND gate 55 has its inputs connected to the A output of the flip-flop $\overline{A}$, the B output of flip-flop B and the $\overline{C}$ output of flip-flop C.

The waveforms of the A, B and C outputs of the flip-flops A, B and C are shown in FIGS. 5B, 5C and 5D respectively. The waveform of the channel 1 signal on line 71 is shown in FIG. 5E and the waveform of the channel 2 signal on line 72 is shown in FIG. 5F. The channel 1 signal conveys the analog information provided by the setting of the variable resistance R1 in channel 1 of the transmitter circuit of FIG. 1; and the channel 2 signal conveys the analog information provided by the setting of the variable resistance R2 in FIG. 1.

The count registered by the binary counter 52 beyond a count of "3", depends upon the variable number of additional information pulses that are included in the given frame of the pulse train in order to convey binary information. Referring to the table of FIG. 6, when one additional information pulse is included in the pulse train, the binary counter 52 registers a count of "4"; when two additional information pulses are provided, the counter registers a count of "5"; etc. It is readily seen from the table of FIG. 6, that the state of the binary signal provided at binary input channel A in FIG. 1 can be ascertained by reading out the state of the flip-flop A and the state of the binary signal provided at binary input channel B in FIG. 1 can be ascertained by reading out the state of flip-flop B.

Flip-flops A and B are read out to determine such binary information only after the pulse count has been completed in each frame. To assure that the count for each frame is completed by the binary counter 52 before the flip-flops A and B are so read out, the read operation takes place during the synchronization period (sync). Accordingly, the sync timer circuit 57 internally produces a signal having a waveform as shown in FIG. 5G in response to the pulse train signal provided on line 69. During each low-level interval of the pulse train on line 69, the sync timer signal (FIG. 5G) is brought to a low level and maintained at the low level. However, during each high-level interval of the pulse train on line 69, the sync timer signal is caused to rise, whereby the amount of rise is dependent upon the high-level duration of the pulse. It is only after all of the relatively short analog information and digital information pulses have been concluded and the sync pulse follows in the pulse train on line 69 that the internal sync timer signal (FIG. 5G) rises to a high enough level to trigger a sync signal on line 74, as shown in FIG. 5H. The sync signal on line 74 terminates upon the negative-going transition at the end of the sync pulse on line 69.

The read counter circuit 59 responds to the leading edge of the sync pulse on line 74 by producing a short read counter pulse on line 76 to gates 63 and 64. It is during the duration of the read counter pulse on line 76 that the gates 63 and 64 are enabled to read the state of signals in flip-flops A and B respectively. The signals read by gates 63 and 64 during the interval of the read counter pulse on line 76 are latched into latch circuits 66 and 67 respectively and provided on lines 82 and 83 to binary information output channels A and B respectively. The respective states of the binary signals in output channels A and B in the receiver circuit of FIG. 4 corresponds to the respective states of the binary signals in binary information input channel A and B in the transmitter circuit of FIG. 1.

The reset circuit 61 responds to the trailing edge of the read counter pulse on line 76 and provides a reset counter pulse on line 78 to reset each of the three flip-flops A, B and C of the binary counter 52.

We claim:

1. A communications system for communicating both analog information and binary information in a single frame of a pulse train, comprising:
    a first number "m" of analog information input channels for providing analog input information, wherein "m" is a positive integer greater than or equal to "one";
    means for sequentially multiplexing and modulating the first given number "m" of analog information input channels to produce a first sequence of "m" analog information pulses in each frame of the pulse train, wherein each analog information pulse respectively has a width that is proportional to the amplitude of the analog information in the respective analog information input channel;
    a second given number "n" of binary information input channels for providing binary input information, wherein "n" is a positive integer greater than "one";
    means for modulating the second given number "n" of binary information input channels to produce a second sequence of binary information pulses in a particular unary code wherein $2^n$ possible states are represented by a number of sequential pulses that are representative of the binary information in the "n" binary information input channels:
    means for multiplexing said second sequence of binary information pulses in each frame of the pulse train sequentially to said first sequence of analog information pulses; and
    means for producing a sync signal that persists for the interval between the second sequence of binary information pulses and the subsequent first sequence of analog information pulses in the next frame.

2. A communications system for communicating both analog information and binary information in a single frame of a pulse train, comprising
    a first given number "n" of binary information input channels for providing "n" binary input signal, wherein "n" is a positive integer greater than "one";
    means coupled to the "n" binary information input channels for translating the state of the "n" binary signals into a binary number and for providing a first signal that is indicative of said binary number;
    a multiplexer including a second given number "m" of analog information input channels, wherein "m" is a positive integer greater than or equal to "one", and modulating means for producing a first sequence of "m" analog information pulses from the analog information input channels, wherein each analog information pulse has a width that is proportional to the amplitude of the analog information in the respective analog information input channel, and further including binary information modulating means responsive to the first signal for producing a second sequence of binary information pulses in a particular unary code wherein $2^n$ possible states are represented by a number of sequential pulses that are representative of said binary number, wherein the second sequence of binary information pulses are produced sequentially to the first sequence of analog information pulses; and
    means for producing a sync signal that persists for the interval between the second sequence of binary information pulses and the subsequent first sequence of analog information pulses in the next frame.

3. A system for producing analog information signals and binary information signals from a pulse train wherein each frame of the pulse train contains a first sequence of a first given number "m" of analog information pulses each having a width that is proportional to the amplitude of the analog information in a respective analog information input channel and a second sequence of binary information pulses in a particular unary code wherein $2^n$ possible states are represented by a number of sequential pulses that are representative of binary information in "n" binary information input channels, followed by a sync signal that persists for the interval between the second sequence of binary information pulses and the subsequent first sequence of analog information pulses in the next frame, wherein "m" is a positive integer greater than or equal to "one" and "n" is a positive integer greater than "one", comprising
    a binary counter for counting the number of information pulses in each frame of the pulse train;
    logic means coupled to the counter for producing "m" analog information signals respectively conveying the analog information conveyed by said first sequence of "m" analog information pulses in each frame;
    gate means coupled to the counter and responsive to the sync signal for producing "n" binary information signals during the interval of the sync signal after said count is completed for each frame, wherein the "n" binary information signals contains binary information that is representative of the number of binary information pulses included in said count of information pulses of each frame, and
    means for resetting the counter during the interval of the sync signal in response to the beginning of the sync signal and at a time subsequent to the production of said "n" binary information signals.

* * * * *